No. 691,220. Patented Jan. 14, 1902.
J. WEST.
APPARATUS FOR CUTTING ELLIPTICAL OR OTHER SHAPED LENSES ACCURATELY IN RELATION TO THEIR FOCAL CENTER WHILE BEING CUT.
(Application filed May 20, 1901.)
(No Model.)

UNITED STATES PATENT OFFICE.

JAMES WEST, OF DALSTON, ENGLAND, ASSIGNOR OF TWO-THIRDS TO HENRY JOSEPH WILBERFORCE RAPHAEL, OF SHEPHERDS BUSH, MIDDLESEX COUNTY, ENGLAND, AND HERMANN LIONEL ETTINGHAUSEN, OF LONDON, ENGLAND.

APPARATUS FOR CUTTING ELLIPTICAL OR OTHER SHAPED LENSES ACCURATELY IN RELATION TO THEIR FOCAL CENTER WHILE BEING CUT.

SPECIFICATION forming part of Letters Patent No. 691,220, dated January 14, 1902.

Application filed May 20, 1901. Serial No. 61,138. (No model.)

*To all whom it may concern:*

Be it known that I, JAMES WEST, a subject of the King of Great Britain, residing at Dalston, in the county of Middlesex, England, have invented a certain new and useful Improvement in Apparatus for Cutting Elliptical or other Shaped Lenses so that They are Held Accurately in Relation to Their True Focal Center While Being Cut, of which the following is a specification.

My invention relates to a device which may be applied to any ordinary ellipsograph or machine for carrying a diamond, which is moved in an elliptical or circular path for cutting out lenses, and by which device the lenses are simply and easily adjusted and firmly held accurately in relation to their true focal center upon such machines. I attain this object by the means illustrated in the accompanying drawings, in which—

Figure 1:
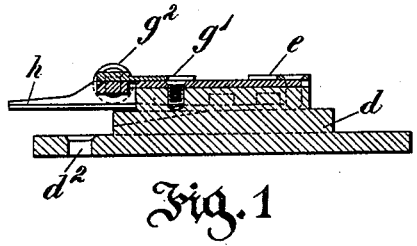
Figure 2:
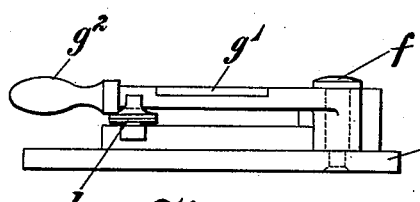
Figure 4:
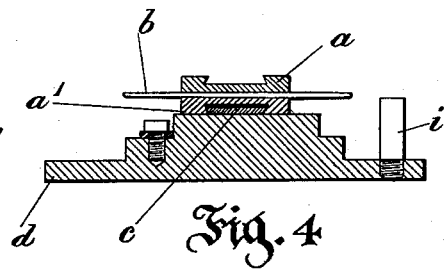
Figure 3:
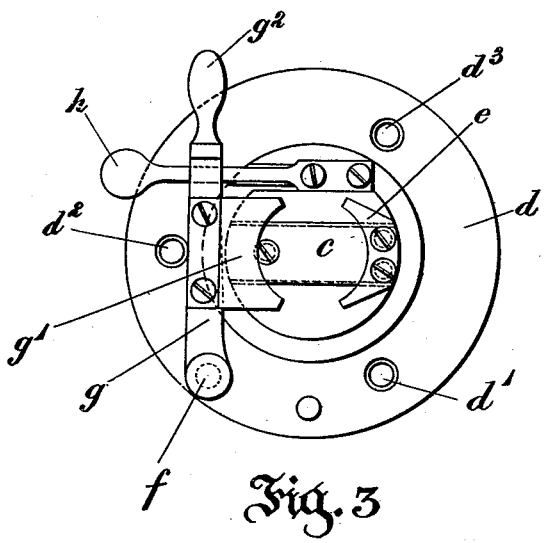
Figure 5:
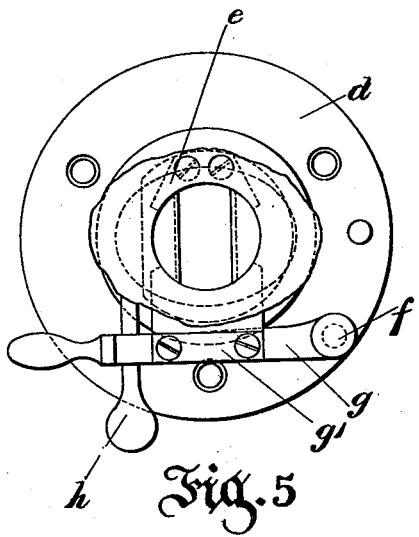

Figure 1 is a sectional view of the device. Fig. 2 is a side view; Fig. 3, a plan. Fig. 4 is a sectional view showing the lens in position. Fig. 5 is a plan showing the device complete with the lens in position. In this view the dotted line shows the path of the diamond for an elliptical lens.

I first ascertain the true focal center of the lens by means of a centering apparatus of the kind fully set forth and claimed in my concurrent application, Serial No. 61,135, filed May 20, 1901, and I then fix upon each side of it a support or "dop" by means of the devices fully set forth and claimed in my concurrent application, Serial No. 61,136, filed May 20, 1901.

$a$ $a'$ represent the two dops, which consist of metallic disks grooved transversely with a recess of a dovetailed shaped in section, and $b$ shows the lens held between the dops. A dovetail-shaped strip $c$, which is a counterpart of the grooves in the dops $a$ $a'$, is mounted upon a stepped base $d$, and the dovetailed strip $c$ is provided at one end with a fixed stop $e$, having a concave mouth. Mounted on the base $d$ is a stud-pin $f$, to which is pivotally centered a movable lever-arm $g$, provided with a stop $g'$, having a concave mouth arranged to correspond with the opposite stop $e$. This lever-arm is operated by means of the handle $g^2$ and is securely held when closed by the spring-catch $h$. The stepped base $d$ is provided with screw-holes $d'$ $d^2$ $d^3$, by means of which it may be mounted and fixed in the true foci of any ellipsograph.

Fig. 3 shows the device with the lever-arm $g$ closed as if holding a lens. If the spring $h$ be depressed, the lever-arm $g$ may be swung open to admit the lens, which is placed in position by sliding either one of the dops $a$ $a'$ upon the dovetailed strip $c$. The lever-arm $g$ is then returned and is caught by the spring $h$. The stops $e$ and $g'$ snugly fit around the dops and effectually prevent any movement during the time the lens is being cut by the diamond. The backward movement of the lever-arm $g$ is limited by the stop-pin $i$, Fig. 4.

Having fully described my invention, what I desire to claim and secure by Letters Patent is—

1. The combination of the stepped support $d$, the dovetailed strip $c$ fitting the corresponding transverse recesses in the "dops" $a$, $a'$, fixed accurately to the sides of the lens $b$ which is to be ground to shape, the fixed stop $e$ having a concave edge fitting the edge of the dop, the opposite corresponding concave stop $g'$, carried by the lever or handle $g$ turning upon the stud $f$ fixed in the support $d$, the spring-catch $h$, and the holes $d'$, $d^2$, $d^3$, for fixing the support $d$ upon an ellipsograph of any suitable kind, substantially as and for the purpose described and illustrated.

2. In a device of the character described, the combination with a stepped support and a dovetail strip on said support, of concave holders adapted to hold the dops secured to a lens, said dops engaging said dovetail strip, substantially as described.

3. In a device of the character described, the combination with a stepped support and a dovetail strip on said support, of a concave holder secured to said support, a second concave holder pivoted to said support, said holders being adapted to hold the dops secured to a lens, which dops engage said dovetail strip, and means for locking said pivoted holder, substantially as described.

4. In a device of the character described, the combination with a stepped support, a dovetail strip on said support, and holders also secured to said support, of dops adapted to be secured to a lens, said dops having dovetail grooves to fit said dovetail strip, and said dops being adapted to be held by said holders, substantially as described.

In witness whereof I have hereunto set my hand in the presence of two witnesses.

JAMES WEST.

Witnesses:
ALFRED T. BRATTON,
H. ARTHUR MARSHALL.